United States Patent Office.

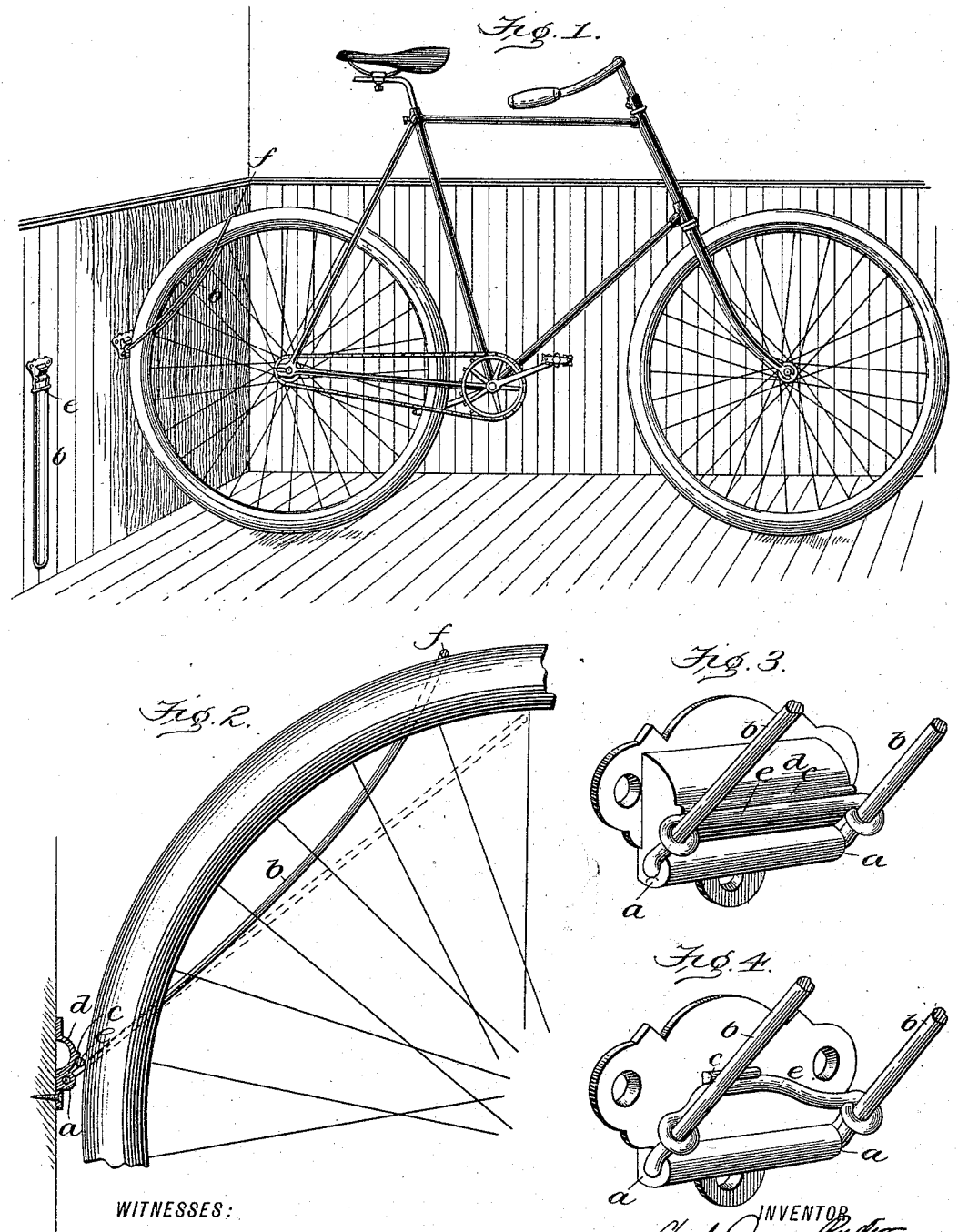

CHARLES JAMES RYDER, OF PATCHOGUE, NEW YORK.

BICYCLE-HOLDER.

SPECIFICATION forming part of Letters Patent No. 573,038, dated December 15, 1896.

Application filed March 16, 1896. Serial No. 583,441. (No model.)

*To all whom it may concern:*

Be it known that I, CHARLES JAMES RYDER, a citizen of the United States, residing at Patchogue, in the county of Suffolk and State of New York, have invented a certain new and useful Bicycle-Holder, of which the following is a specification.

My improvement is directed to the production of a loop-bracket device hinged to the wall or post as a holder for a bicycle, wherein the bracket, while forming the hinge for the loop, forms also an abutment against which the loop is firmly supported when in position to receive the tire of the wheel, so that the resistance of such abutment when the wheel is driven into the loop causes the latter to assume a slightly-bowed form to increase its gripping force upon the tire and thereby more securely hold the wheel and the bicycle in the desired position.

The precise improvement resides in the provision of a loop and of an abutment against which the loop bears and is firmly supported in position to receive the tire of the wheel and is caused to be lifted at its outer end and bowed lengthwise with a grasping function upon the tire.

The accompanying drawings illustrate my improved bicycle-holder, wherein—

Figure 1 shows the loop-bracket holder as applied to the bicycle-wheel. Fig. 2 shows a vertical section of the loop-holding bracket in the position it occupies when the wheel is being forced into the loop. Fig. 3 shows a perspective view of the holding-loop in its abutting relation to the hinge-bracket, and Fig. 4 is a modification of the abutment-bearing.

The bracket is formed of a suitable plate adapted to be screwed or otherwise secured to the wall or to a post where it is convenient to hold the bicycle. The bracket has suitable sockets *a a* to receive the right-angle ends of a loop *b* and form a hinge upon which the loop is hung, so that it can be moved in a vertical plane, hanging downward out of the way when not in use and raised to an upward-standing fixed angle to receive the tire of the wheel. In this position the loop is supported against an abutment *c*, which I prefer to form by a bulged part of the plate, provided with a rib *d* above the hinge and a coöperating part on the hinged end of the loop, as a tie-band *e*, fastened to clasp the hinge-forming ends of the loop in position to be brought in contact with said abutment when the loop is raised. I prefer the tie-link, because it gives a uniform support to both the hinge-forming ends of the loop and because it serves the function of a clasp to secure and to bind the bent ends of the loop in the hinge-forming sockets of the bracket. The abutment-bearing for the two parts, however, may be differently formed, so long as they are in the relation stated and affords a firm support to the hinged end of the loop, when in position to resist the forcing of the wheel-tire within the loop. In this position the loop stands upward at an angle of about forty-five degrees from the wall when engaged with the abutment, and the advantage of this abutment is that it affords a solid support for the loop while the tire of the wheel is being forced into it. In this forcing of the wheel it comes in contact with the outer end *f* of the loop, which will thereby be forced upward and cause the loop to have a slightly-bowed form, as seen in Fig. 1, which form causes the sides of the loop to slightly close and bind upon and clasp the tire, giving a firm hold thereon to sustain the wheel in the desired position and to properly hold the bicycle.

It will be understood that the loop has a spring function and is of slightly less width than the width of the tire, so that in forcing the wheel into the loop the latter will be slightly sprung open, and as the loop is bowed by the pressure of the wheel against the end of the loop this action will cause the sides of the loop to resume their parallel relation with a binding action upon the tire. As the loop is sprung open in receiving the tire the bowing of the loop acts to close its sides upon the tire.

In applying the device to the wall the position of the bracket is preferably on a horizontal line with the axis of the wheel, so that when hanging down out of use the loop will clear the floor; but an important advantage is thereby obtained in locating the loop so that it will embrace about one-sixth of the circumference of the tire, which I find gives the loop a length to give the best leverage upon the wheel with a minimum strain upon the hinge and the maximum stiffness and strength to the loop.

It is important to notice that the tie-link acts as a truss to the hinged end of the loop and braces and renders it sufficiently strong to resist the force required to bow the loop in driving the wheel into it, but this bowing does not become active until the tire comes in contact with the end of the loop. The tie-link also serves to prevent the twisting of the sides of the loop upon its hinged ends, and the loop for this purpose is indented for the engagement of the link, the ends of which I prefer to swage by dies over the sides of the loop, so that the hinge ends of the latter will be locked against displacement and bound tight enough in the bracket-sockets to automatically hold the loop in its elevated position, leaving both hands free to apply the wheel to the loop.

In applying the loop to the bracket the right-angled hinge-forming ends of the loop are sprung into the bracket-sockets, and the ends of the cross-tie are then swaged upon the loop to brace and secure its hinge ends; and, as it is necessary to drive the wheel hard into the loop to obtain the advantage of bowing it, the function of the cross-tie prevents the heavy strain incident to such bowing action from twisting the loop upon its hinge ends and gives the loop the required firm hold upon the wheel. In this particular the cross-tie in its double function as a brace and an abutment-bearing upon the bracket is the feature which gives strength and stiffness and a positive clamping function to safely hold the bicycle by one of its wheels.

In fixing the bracket about on a horizontal plane with the axis of the wheel the abutting action will sustain the loop, so that its outer end will be forced or sprung upward in driving the wheel into it.

I prefer to use No. 7 gage steel wire for the loop.

I claim—

1. In a bicycle-holder, the combination with a fixed bracket, of a loop hinged thereto and provided with a cross-tie, adapted to engage the bracket above the hinge as an abutment for sustaining the loop at a fixed angle to receive the tire and resist the force required to drive it into the loop and to cause the latter to be bowed and thereby to increase the clamping function of the loop upon the wheel.

2. In a bicycle-holder, the combination with a fixed bracket having a bulge provided with a rib, with a loop hinged to said bracket below said bulge-rib and provided with a cross-tie arranged to engage said bulge-rib in meeting bearings across the hinged end of the loop to sustain it equally at both sides in position to clamp and hold the wheel in the way described.

CHARLES JAMES RYDER.

Witnesses:
A. E. H. JOHNSON,
A. ROLAND JOHNSON.